United States Patent
Mullins et al.

(10) Patent No.: US 8,724,281 B2
(45) Date of Patent: May 13, 2014

(54) TECHNIQUES FOR DETECTING REMOVAL OF A CONNECTOR

(71) Applicant: Apple Inc., Cupertino, CA (US)

(72) Inventors: Scott Mullins, Gilroy, CA (US); Alexei Kosut, Mountain View, CA (US); Jeffrey J. Terlizzi, San Francisco, CA (US); Jahan Minoo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/721,564

(22) Filed: Dec. 20, 2012

(65) Prior Publication Data

US 2013/0286523 A1 Oct. 31, 2013

Related U.S. Application Data

(63) Continuation of application No. 13/607,404, filed on Sep. 7, 2012.

(60) Provisional application No. 61/638,402, filed on Apr. 25, 2012.

(51) Int. Cl.
*G06F 1/32* (2006.01)

(52) U.S. Cl.
CPC .............. *H10R 13/7039* (2013.01); *G06F 1/32* (2013.01); *G06F 1/3231* (2013.01); *G06F 1/3206* (2013.01)
USPC ............. 361/93.9; 439/60; 439/489; 439/567

(58) Field of Classification Search
CPC ....... G06F 1/32; G06F 1/3231; G06F 1/3206; H01R 13/7039
USPC ............................ 361/93.9; 439/60, 489, 567
See application file for complete search history.

(56) References Cited

U.S. PATENT DOCUMENTS

| | | |
|---|---|---|
| 4,792,986 A | 12/1988 | Garner et al. |
| 4,968,929 A | 11/1990 | Hauck et al. |

(Continued)

FOREIGN PATENT DOCUMENTS

| | | |
|---|---|---|
| DE | 202004012084 U1 | 11/2004 |
| EP | 1215561 A2 | 6/2002 |

(Continued)

OTHER PUBLICATIONS

NA9309167, Personal Computer Menu Card International Association—Compatible Battery and Charging Cards, Sep. 1993, IBM Technical Disaclosure Bulletin, pp. 1-4.*

(Continued)

*Primary Examiner* — Rexford Barnie
*Assistant Examiner* — Zeev V Kitov
(74) *Attorney, Agent, or Firm* — Kilpatrick Townsend & Stockton LLP

(57) ABSTRACT

A system that detects electrical disconnection of one connector from another connector includes a detection circuitry and a protection circuitry. The detection circuitry detects that a plug connector has been electrically disconnected from a corresponding receptacle connector. In response to the detection, the detection circuitry sends a signal to the protection circuitry. In response to the signal, the protection circuitry lowers or terminates power being supplied to a host device via one of the contacts of the plug connector. This helps to prevent shocks/shorts that may be caused by accidental disconnection of the plug connector.

20 Claims, 13 Drawing Sheets

(56) References Cited

U.S. PATENT DOCUMENTS

| | | | |
|---|---|---|---|
| 5,087,871 A * | 2/1992 | Losel | 323/299 |
| 5,387,110 A | 2/1995 | Kantner et al. | |
| 5,442,243 A | 8/1995 | Bailey | |
| 5,568,610 A * | 10/1996 | Brown | 714/48 |
| 5,929,708 A * | 7/1999 | Davis et al. | 330/288 |
| 6,145,037 A | 11/2000 | Sakakibara | |
| 6,368,146 B2 | 4/2002 | Abbott | |
| 6,452,402 B1 | 9/2002 | Kerai | |
| 6,671,814 B1 | 12/2003 | Kubo et al. | |
| 6,764,345 B1 * | 7/2004 | Duesterhoeft et al. | 439/637 |
| 6,836,814 B2 | 12/2004 | Takaoka et al. | |
| 6,902,412 B2 * | 6/2005 | Higgins | 439/101 |
| 6,973,658 B2 | 12/2005 | Nguyen | |
| 6,981,887 B1 | 1/2006 | Mese et al. | |
| 7,039,731 B2 | 5/2006 | Hasegawa | |
| 7,058,075 B1 | 6/2006 | Wong et al. | |
| 7,094,086 B2 | 8/2006 | Teicher | |
| 7,123,022 B2 | 10/2006 | Parker et al. | |
| 7,216,191 B2 | 5/2007 | Sagues et al. | |
| 7,277,966 B2 | 10/2007 | Hanson et al. | |
| 7,392,946 B2 | 7/2008 | Hellström et al. | |
| 7,442,091 B2 | 10/2008 | Salolmon et al. | |
| 7,458,825 B2 | 12/2008 | Atsmon et al. | |
| 7,463,042 B2 | 12/2008 | Pereira | |
| 7,496,671 B2 | 2/2009 | Engel et al. | |
| 7,525,281 B2 * | 4/2009 | Koyanagi et al. | 320/107 |
| 7,589,536 B2 | 9/2009 | Terlizzi et al. | |
| 7,716,400 B2 | 5/2010 | Raines | |
| 7,717,717 B1 | 5/2010 | Lai | |
| 7,863,906 B2 | 1/2011 | Terlizzi et al. | |
| 7,890,284 B2 | 2/2011 | Patterson et al. | |
| 2003/0068033 A1 | 4/2003 | Kiko | |
| 2003/0222499 A1 | 12/2003 | Ely et al. | |
| 2004/0023560 A1 | 2/2004 | Swoboda | |
| 2005/0048816 A1 | 3/2005 | Higgins | |
| 2005/0097212 A1 | 5/2005 | Engel et al. | |
| 2006/0047982 A1 | 3/2006 | Lo et al. | |
| 2006/0261792 A1 | 11/2006 | Liao et al. | |
| 2007/0001691 A1 | 1/2007 | Pereira | |
| 2007/0178771 A1 | 8/2007 | Goetz et al. | |
| 2007/0229122 A1 | 10/2007 | Kiyozaki | |
| 2007/0245058 A1 | 10/2007 | Wurzburg et al. | |
| 2007/0287302 A1 | 12/2007 | Lindberg et al. | |
| 2008/0164934 A1 | 7/2008 | Hankey et al. | |
| 2008/0274633 A1 | 11/2008 | Teicher | |
| 2009/0021873 A1 | 1/2009 | Spode et al. | |
| 2009/0108848 A1 | 4/2009 | Lundquist | |
| 2009/0125970 A1 | 5/2009 | Fitzpatrick et al. | |
| 2010/0078992 A1 | 4/2010 | Landry et al. | |
| 2010/0100200 A1 | 4/2010 | Kim et al. | |
| 2010/0279554 A1 | 11/2010 | Steijner | |
| 2011/0110407 A1 | 5/2011 | Sun | |
| 2011/0122663 A1 | 5/2011 | Huang | |
| 2013/0286522 A1 | 10/2013 | Mullins et al. | |

FOREIGN PATENT DOCUMENTS

| | | | | |
|---|---|---|---|---|
| EP | 1286429 A2 | | 2/2003 | |
| FR | 2138961 A1 | | 1/1973 | |
| JP | 6155974 A | | 6/1994 | |
| JP | 08336281 | * | 4/1995 | G05F 1/10 |
| JP | 08336281 | * | 12/1996 | H02M 7/06 |
| JP | 2003-217728 A | | 7/2003 | |
| WO | 2005/013436 A1 | | 2/2005 | |
| WO | 2006/013553 A2 | | 2/2006 | |
| WO | 2008/065659 A2 | | 6/2008 | |
| WO | 2009/069969 A2 | | 6/2009 | |
| WO | 2011150403 A1 | | 12/2011 | |

OTHER PUBLICATIONS

The Authoritative Dictionary of IEEE Standards Terms, Dec. 2000, IEEE Inc., pp. 221.*
Non-Final Office Action for U.S. Appl. No. 13/232,989, mailed on Feb. 24, 2012, 9 pages.
Non-Final Office Action for U.S. Appl. No. 13/232,989, mailed on May 25, 2012, 22 pages.
Non-Final Office Action for U.S. Appl. No. 13/232,978, mailed on May 7, 2012, 18 pages.
Final Office Action for U.S. Appl. No. 13/232,978, mailed on Nov. 6, 2012, 32 pages.
European Search Report for European Application No. 13161966.0, mailed Aug. 21, 2013, 6 pages.
International Search Report and Written Opinion for PCT Application No. PCT/US2013/034182, mailed on Jul. 12, 2013, 11 pages.
Non-Final Office Action for U.S. Appl. No. 13/607,404, mailed Jan. 29, 2014, 31 pages.

* cited by examiner

| ACC1 | Data A+ | Data A- | P_IN | P_IN | Data B- | Data B+ | ACC2 |
|---|---|---|---|---|---|---|---|
| 206(1) | 206(2) | 206(3) | 206(4) | 206(5) | 206(6) | 206(7) | 206(8) |

*Fig. 2B*

| GND | Data A+ | Data A- | ACC1 | P_IN | Data B- | Data B+ | ACC2 |
|---|---|---|---|---|---|---|---|
| 206(1) | 206(2) | 206(3) | 206(4) | 206(5) | 206(6) | 206(7) | 206(8) |

*Fig. 2C*

TECHNIQUES FOR DETECTING REMOVAL OF A CONNECTOR

CROSS-REFERENCES TO RELATED APPLICATIONS

This application is a continuation of U.S. patent application Ser. No. 13/607,404 filed on Sep. 7, 2012, which in turn claims benefit under 35 USC §119(e) to U.S. Provisional Patent Application No. 61/638,402 filed Apr. 25, 2012, the disclosure of both these applications are incorporated by reference in their entirety herein for all purposes.

BACKGROUND

Connectors are ubiquitous and are used in variety of applications for coupling two devices. Most connectors usually have some sort of contacts that facilitate transmission of signals between the devices connected using a connector. Conventionally, each contact in a connector has a specific pre-assigned function. In other words, each contact in a connector is designated to carry a certain type of signal, e.g., power, data, etc.

Some connectors may be designed to operate as pairs. For example, a first connector may be a plug (or "male") connector that can be mated with its corresponding receptacle (or "female") connector. In this instance, once mated the contacts in the plug connector are in physical and electrical contact with contacts in the receptacle connector.

Contacts of a plug connector may carry various types of signals including data, timing, power, etc. In some instances when a plug connector provides power to another device, unless proper protection is provided, an accidental physical disconnection of the plug connector may pose an arcing or shorting threat due to power present on its contacts.

SUMMARY

Embodiments of the present invention relate to techniques for determining when a connector is electrically disconnected from another connector. Some embodiments of the present invention also provide methods for reducing or terminating power on a contact of the disconnected connector.

In an embodiment, a connector associated with an accessory is in electrical connection with another connector associated with a host device. In this instance the accessory may be a charging unit that provides power to the host device utilizing a low resistance path within the accessory. The accessory may also include a high resistance path that may be used to lower the amount of power provided to the host device via the connector of the accessory. When the connector is disconnected from the other connector, a detection unit within the accessory detects a change in state of a communication line between the host device and the accessory. The detection unit waits for a predetermined amount of time to verify that the change in state is not merely transitional. Upon expiration of the predetermined amount of time, if the communication line is still in the changed state, the detection unit determined that the connector is electrically disconnected from the other connector.

Based on the determination that the connector is electrically disconnected from the other connector, the detection unit sends a signal to the protection unit. In response to the signal, the protection unit enables the high resistance/low current path for an incoming power line. This results in reduction or elimination of power/voltage that is present on a power contact of the connector. Thus, even if the connector is accidentally disconnected during normal operation the techniques described herein greatly reduce/eliminate the possibility of the power contact shorting/arching by coming into contact with a grounded object.

In other embodiments, power may be cutoff for every instance when the communication line transitions from a logic "high" state to a logic "low" state. In some embodiments, the communication line may transition from a logic "high" state to a logic "low" state during normal communication. In such an instance, the system may determine the cause of the communication line changing states. If it is determined that the host device caused the change in state, then it is concluded that this is part of the normal communication. However, if it is determined that some change on the accessory side caused the communication line to transition states power is reduced on the power contact of the accessory connector.

The following detailed description, together with the accompanying drawings will provide a better understanding of the nature and advantages of the present invention.

BRIEF DESCRIPTION OF THE DRAWINGS

FIGS. 2B and 2C are diagrams illustrating a pin-out arrangement of a receptacle connector according to two different embodiments of the invention configured to mate with plug connectors 100 and 101, respectively, as shown in FIGS. 1D and 1E.

DETAILED DESCRIPTION

Embodiments of the present invention generally relate to connectors. Specifically, some embodiments of the present invention provide techniques for determining detachment of a plug connector from a corresponding receptacle connector. Certain embodiments of the present invention provide a system and method for terminating power in a plug connector based on the determination that the plug connector was electrically decoupled from a receptacle connector.

Figure 1A:
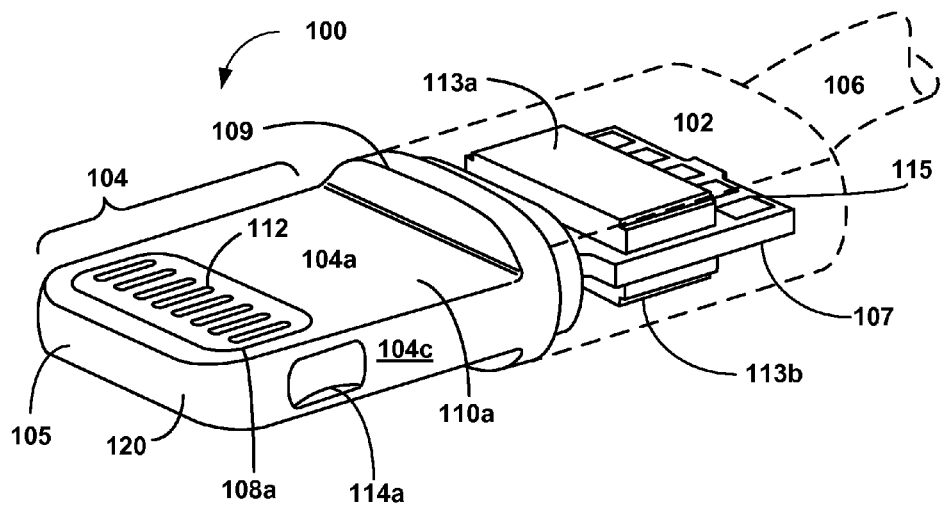
FIGS. 1A and 1B illustrate a plug connector according to an embodiment of the present invention.

FIG. 1A illustrates a plug connector 100 (or accessory-side connector 100) according to an embodiment of the present invention. Plug connector 100 is exemplary and is used herein to explain the various embodiments of the present invention. One skilled in the art will realize that many other forms and types of connectors other than plug connector 100 can be used and that techniques described herein will apply to any plug connector that has the characteristics of plug connector 100. In some embodiments, plug connector 100 may be associated with an accessory that can be coupled to a host device.

Plug connector 100 includes a body 102 and a tab portion 104. A cable 106 is attached to body 102 and tab portion 104 and extends longitudinally away from body 102 in a direction parallel to the length of the connector 100. Tab 104 is sized to be inserted into a corresponding receptacle connector during a mating event and includes a first contact region 108a formed on a first major surface 104a and a second contact region 108b (not shown in FIG. 1A) formed at a second major surface 104b (also not shown in FIG. 1A) opposite surface 104a. Surfaces 104a, 104b extend from a distal tip of the tab to a spine 109 that, when tab 104 is inserted into a corresponding receptacle connector, abuts a housing of the receptacle connector or portable electronic device the receptacle connector is incorporated in. Tab 104 also includes first and second opposing side surfaces 104c, 104d (not shown) that extend between the first and second major surfaces 104a, 104b. In one particular embodiment, tab 104 is about 6.6 mm wide, about 1.5 mm thick and has an insertion depth (the distance from the tip of tab 104 to spine 109) of about 7.9 mm.

A plurality of contacts 112 can be formed in each of contact regions 108a and 108b such that, when tab 104 is inserted into a corresponding receptacle connector, contacts 112 in regions 108a or 108b are electrically coupled to corresponding contacts in the receptacle connector. In some embodiments, contacts 112 are self-cleaning wiping contacts that, after initially coming into contact with a receptacle connector contact during a mating event, slide further past the receptacle connector contact with a wiping motion before reaching a final, desired contact position.

As an example, in one embodiment an ID module is embodied within an IC operatively coupled to the contacts of connector 100. The ID module can be programmed with identification and configuration information about the connector and/or its associated accessory/adapter that can be communicated to a host device during a mating event. As another example, an authentication module programmed to perform an authentication routine, for example a public key encryption routine, with circuitry on the host device can be embodied within an IC operatively coupled to connector 100. The ID module and authentication module can be embodied within the same IC or within different ICs. As still another example, a current regulator can be embodied within one of IC's 113a or 113b. The current regulator can be operatively coupled to contacts that are able to deliver power to charge a battery in the portable electronic device and regulate current delivered over those contacts to ensure a constant current regardless of input voltage and even when the input voltage varies in a transitory manner. The function of the IC's is further described below in reference to FIG. 4.

Bonding pads 115 can also be formed within body 102 near the end of PCB 107. Each bonding pad can be connected to a contact or contact pair within regions 108a and 108b. Wires (not shown) can then be soldered to the bonding pads to provide an electrical connection from the contacts to circuitry within an accessory associated with connector 100. In some embodiments, however, bonding pads are not necessary and instead all electrical connections between the contacts and components of connector 100 and other circuitry within an accessory are made through traces on a PCB that the circuitry is coupled to and/or by interconnects between multiple PCBs within the accessory.

The structure and shape of tab 104 is defined by a ground ring 105 that can be made from stainless steel or another hard conductive material. Connector 100 includes retention features 114a, 114b (not shown) formed as curved pockets in the sides of ground ring 105 that double as ground contacts. Body 102 is shown in FIG. 1A in transparent form (via dotted lines) so that certain components inside the body are visible. As shown, within body 102 is a printed circuit board (PCB) 107 that extends into ground ring 105 between contact regions 108a and 108b towards the distal tip of connector 100. One or more integrated circuits (ICs), such as Application Specific Integrated Circuit (ASIC) chips 113a and 113b, can be operatively coupled to PCB 107 to provide information regarding connector 100 and/or to perform specific functions, such as authentication, identification, contact configuration and current or power regulation.

Figure 1B:
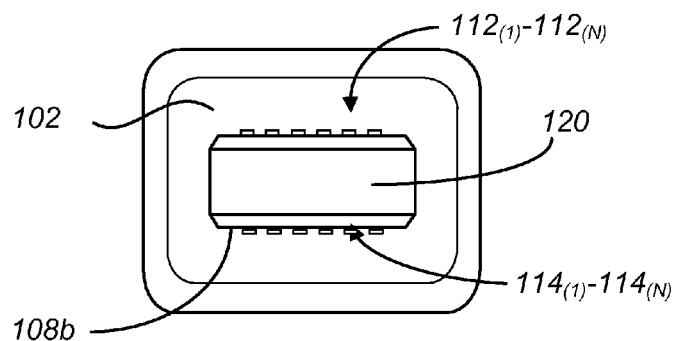

FIG. 1B illustrates a front view of plug connector 100. The front view illustrates a cap 120. Cap 120 can be made from a metal or other conductive material and can extend from the distal tip of connector 100 along the side of the connector towards body 102 either fully or partially surrounding contacts 112 formed in contact regions 108a and 108b in the X and Y directions. In some embodiments, cap 120 can be grounded in order to minimize interference that may otherwise occur on contacts 112 of connector 100 and can thus be referred to as a "ground ring", e.g., ground ring 105 illustrated in FIG. 1A. Contacts $112_{(1)}$-$112_{(N)}$ can be positioned within contact region 108a and additional contacts $114_{(1)}$-$114_{(N)}$ can be positioned within region 108b on the opposing surface of tab 104. In some embodiments, N can be between 2 and 8. Contacts $112_{(1)}$ ... $112_{(N)}$ and $114_{(1)}$ ... $114_{(N)}$ can be used to carry a wide variety of signals including digital signals and analog signals as well as power and ground.

Figure 1C:
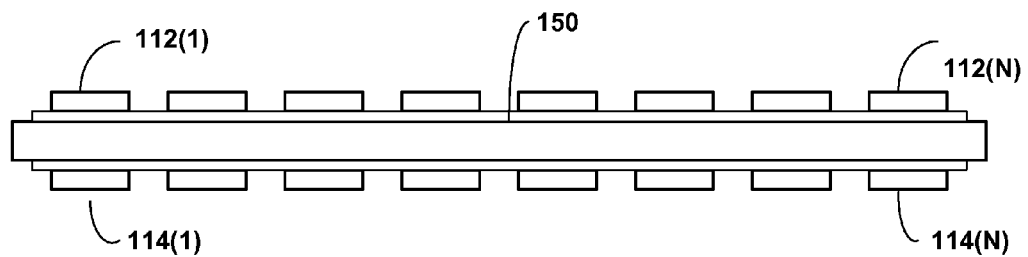
FIG. 1C is a cross-sectional view of a plug connector according to an embodiment of the present invention.

FIG. 1C illustrates a cross-sectional schematic view of contacts 112, 114 and positioning of the contacts within connector 100 according to an embodiment of the present invention. Contacts 112, 114 can be mounted on either side of a PCB 150 as illustrated. In some embodiments, opposing contacts, e.g., $112_{(1)}$ and $114_{(1)}$ may be shorted or electrically connected to each other through PCB 150, e.g., using a via, to create an in-line connector design. In other embodiments, all contacts may be independent with no connections between any of the contacts or the contacts may have other connections schemes between them. In the instance where each contacts is independent and not connected to any other contact, a different receptacle connector, e.g., connector 200 of FIG. 2, may be used. Contacts 112, 114 can be made from a copper, nickel, brass, a metal alloy or any other appropriate conductive material. Spacing is consistent between each of the contacts on the front and back sides and between the contacts and the edges of the connector providing 180 degree symmetry so that plug connector 100 can be inserted into a corresponding receptacle connector in either of two orientations.

Although a specific type of plug connector 100 is described above, it is to be understood that the plug connector 100 is exemplary and merely used herein to explain the various embodiments of the present invention. One skilled in the art will realize that techniques described herein are equally applicable to any other type of connector that has one or more contacts, has contacts only one side, etc. As long as a connector has contacts/pins that can be electrically coupled to contacts of another connector, the techniques described herein can be successfully used to detect removal of such a connector and to terminate power on the connector.

When connector 100 is properly engaged with a receptacle connector each of contacts $112_{(1)}$-$112_{(N)}$ or $114_{(1)}$-$114_{(N)}$ is in electrical contact with a corresponding contact in the receptacle connector. In some embodiments, to establish the electrical contact, the contacts of connector 100 may also be in physical connection with the contacts in the receptacle connector, however this is not required.

Figure 1D:
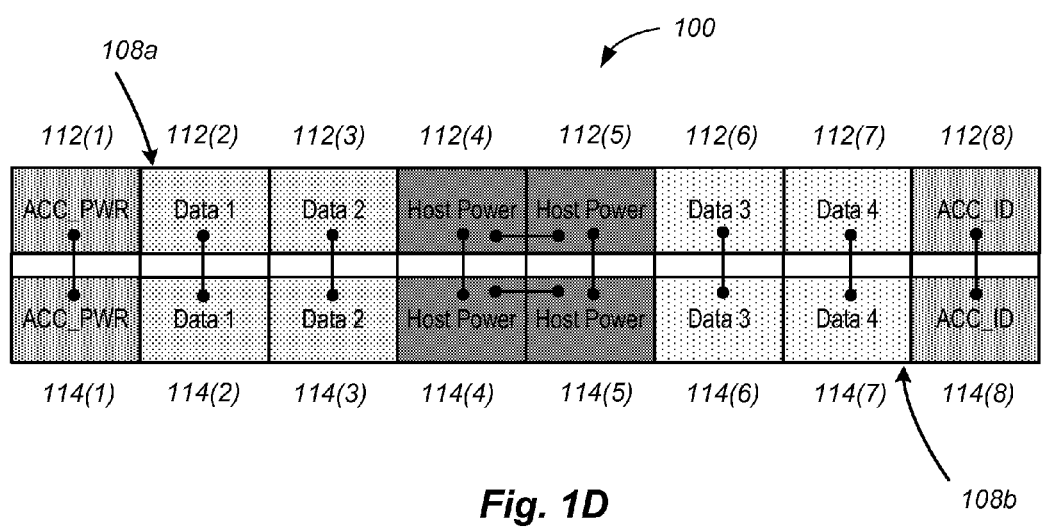
FIG. 1D illustrates a pin-out configuration for a plug connector according one particular embodiment of the present invention.

FIG. 1D illustrates a pin-out configuration for a connector 100 according one particular embodiment of the present invention.

The pin-out shown in FIG. 1D includes four contacts 112 (4), 112(5), 114(4), and 114(5) that are electrically coupled together to function as a single contact dedicated to carrying power to a connected host device. Connector 100 may also include accessory ID contacts 112(8) and 114(8); accessory power contacts 112(1) and 114(1); and eight data contacts arranged in four pairs. The four pairs of data contacts may be (a) 112(2) and 112(3), (b) 112(6) and 112(7), (c) 114(2) and 114(3), and (d) 114(6) and 114(7). Host power contacts 112 (4), 112(5), 114(4), and 114(5) carry power from an accessory associated with connector 100 to a portable electronic device that is coupled to the accessory via connector 100. The host power contacts can be sized to handle any reasonable power requirement for an electronic device or host device, and for example, can be designed to carry between 3-20 Volts from an accessory to charge the portable electronic device connected to connector 100. In this embodiment, host power contacts 112(4), 112(5), 114(4), and 114(5) are positioned in the center of contact regions 108a, 108b to improve signal integrity by keeping power as far away as possible from the sides of ground ring 105.

Accessory power contacts 112(1) and 114(1) can be used for an accessory power signal that provides power from the electronic device (i.e. the host device) to an accessory. The accessory power signal is typically a lower voltage signal than the host power in signal received over host power contacts 112(4) and 112(5), for example, 3.3 volts as compared to 5 volts or higher. The accessory ID contacts provide a communication channel that enables the host device to authenticate the accessory and enable the accessory to communicate information to the host device about the accessory's capabilities as described in more detail below.

The four pairs of data contacts (a) 112(2) and 112(3), (b) 112(6) and 112(7), (c) 114(2) and 114(3), and (d) 114(6) and 114(7) may be used to enable communication between the host and accessory using one or more of several different communication protocols. For example, data contacts 112(2) and 112(3) are positioned adjacent to and on one side of the power contacts, while data contacts 112(6) and 112(7) are positioned adjacent to but on the other side of the power contacts. A similar arrangement of contacts can be seen for contacts 114 on the other surface of the PCB. The accessory power and accessory ID contacts are positioned at each end of the connector. The data contacts can be high speed data contacts that operate at rate that is two or three orders of magnitude faster than any signals sent over the accessory ID contact which makes the accessory ID signal look essentially like a DC signal to the high speed data lines. Thus, positioning the data contacts between the power contacts and the ID contact improves signal integrity by sandwiching the data contacts between contacts designated for DC signals or essentially DC signals.

Figure 1E:
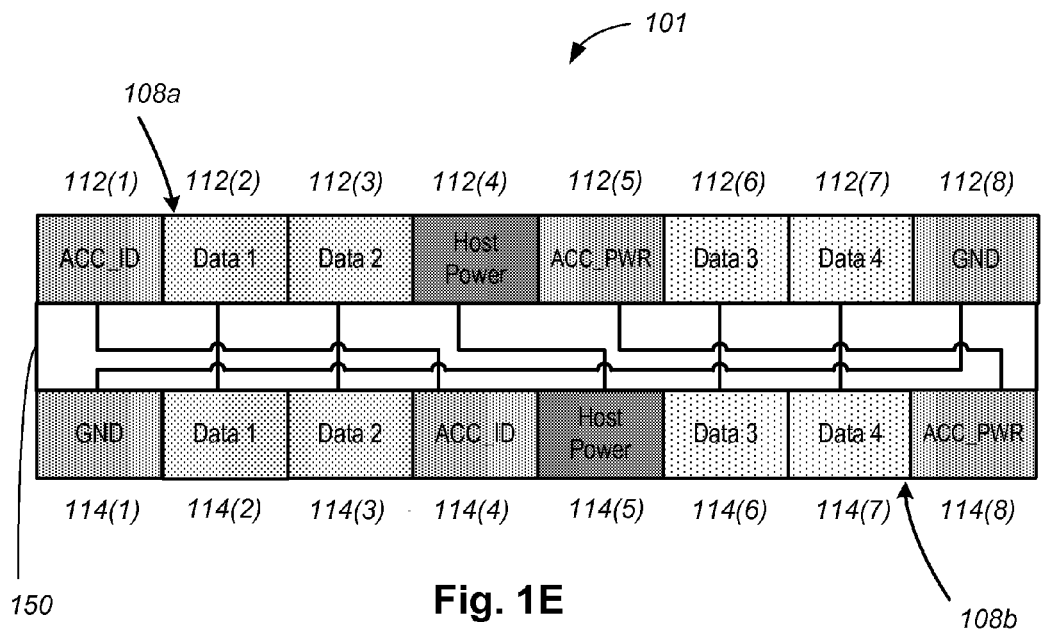
FIG. 1E is a pin-out of a plug connector according to another embodiment of the present invention.

FIG. 1E illustrates a pin-out configuration for a plug connector 101 according another particular embodiment of the present invention.

Connector 101 is a also a reversible connector just like connector 100. In other words, based on the orientation in which connector 101 is mated with a corresponding connector of a host device, either the contacts on the surface 108a or 108b are in physical and electrical contact with the contacts in the corresponding connector of the host device. As illustrated in FIG. 1E, connector 101 may have eight contacts arranged on an upper surface of a PCB 150 and eight contacts arranged on a lower surface of PCB 150.

Connector 101 includes two contacts 112(1) and 114(4) that can function as accessory ID contacts to carry the identification signals between the accessory and the portable electronic device. Contacts 112(1) and 114(4) are electrically connected to each other as illustrated in FIG. 1E. Connector 101 can have four pairs of data contacts, (a) 112(2) and 112(3), (b) 112(6) and 112(7), (c) 114(2) and 114(3), and (d) 114(6) and 114(7). In this particular embodiment, opposing data contacts, e.g., 112(2) and 114(2), are electrically connected to each other via PCB 150 as illustrated in FIG. 1E. Connector 101 may further include host power contacts 112 (4) or 114(5) that may be electrically connected to each other. Host power contacts 112(4) or 114(5) can carry power to the host device that is mated with connector 101. For example, plug connector 101 may be part of a power supply system designed to provide power to the host device. In this instance, either contact 112(4) or 114(5) may carry power from the power supply to the host device, e.g., to charge a battery in the host device.

Connector 101 may further include accessory power contacts 112(5) and 114(8) that may be electrically connected to each other, e.g., via PCB 150. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of connector 101 with respect to a corresponding connector of the host device. Connector 101 may further include two ground contacts 112(8) and 114(1) electrically connected to each other. The ground contacts provide a ground path for connector 101.

Figure 2A:
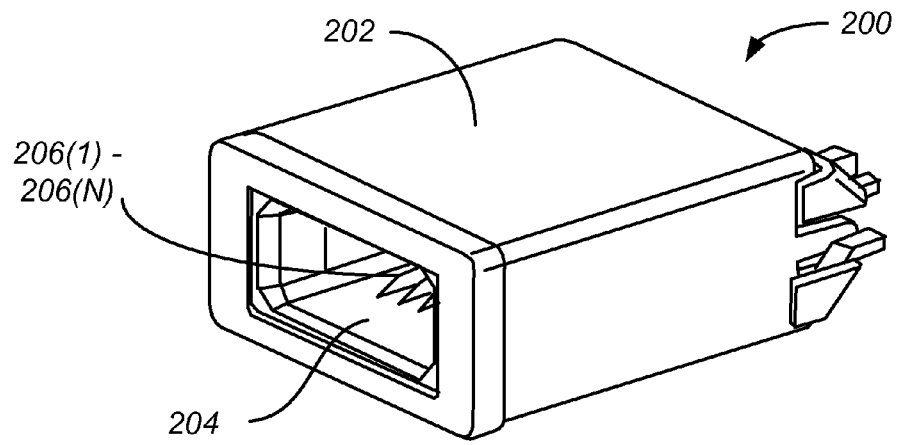
FIG. 2A illustrates a receptacle connector according to an embodiment of the present invention.

FIG. 2A illustrates a receptacle connector 200 according to an embodiment of the present invention.

Receptacle connector 200 includes a housing 202 that defines a cavity 204 that houses contacts $206_{(1)}$-$206_{(N)}$ within the cavity. In operation, a connector plug, such as plug connector 100 can be inserted into cavity 204 to electrically couple the contacts $112_{(1)}$-$112_{(N)}$ or $114_{(1)}$-$114_{(N)}$ to respective contacts $206_{(1)}$-$206_{(N)}$. Each of the receptacle contacts $206_{(1)}$-$206_{(N)}$ electrically connects its respective plug contact to circuitry associated with the electrical device in which receptacle connector 200 is housed. For example, receptacle connector 200 can be part of a portable media device and electronic circuitry associated with the media device is electrically connected to receptacle 200 by soldering tips of contacts $206_{(1)}$-$206_{(N)}$ that extend outside housing 202 to a multilayer board such as a printed circuit board (PCB) within the portable media device. In some embodiments, N can be any integer between 2 and 9.

FIGS. 2B and 2C illustrate pin-out configuration for a receptacle connector 200 according to two different embodiments of the present invention. In one embodiment, receptacle connector 200 has a pin-out as shown in FIG. 2B that matches pin-out of connector 100 in FIG. 1D and in another embodiment, receptacle connector 200 has a pin-out as shown in FIG. 2C that matches pin-out of connector 101 of FIG. 1E. In each of FIGS. 2B and 2C, the ACC1 and ACC2 pins are configured to mate with either the accessory power (ACC_PWR) or accessory ID (ACC_ID) pins of the plug connector depending on the insertion orientation of plug connector, the pair of Data A contacts is configured to mate with either the pair of Data 1 contacts or the pair of Data 2 contacts of the plug connector, and the P_IN (power in) pin or pins are configured to mate with the Host Power contact or contacts of the plug connector. Additionally, in the pin-out of FIG. 2C, the GND contact is configured to mate with the GND contact in the plug connector.

In order to mate connector 100 and connector 200, connector 100 can be physically inserted into cavity 204 of connector 200. Once inserted, contacts of connector 100 can be electrically coupled to contacts of connector 200. As described above, in some embodiments, in order to establish electrical connection, the contacts in connector 100 and 200 may also have to be physically connected. However, techniques described in the present application may only need an electrical connection between the contacts in order to be applicable.

Figure 3:
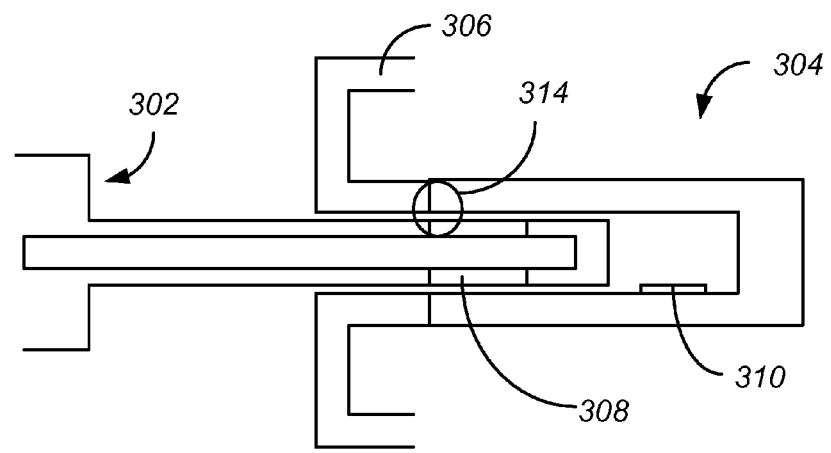
FIG. 3 is a schematic illustrating relative positions of the plug connector and the receptacle connector during an instance in the un-mating sequence according to an embodiment of the present invention.

As described above, techniques described herein provide a method for detecting electrical disconnection of a connector from another connector and in response to the electrical disconnection, terminating or reducing power being provided by the connector. One reason for terminating the power is to protect the connector and other devices from arcing, short circuit, or a shock hazard. In order to understand why there is a need to terminate power present on the connector, it is useful to understand the potential shock/hazard points in the mating and/or un-mating process of these connectors. FIG. 3 is a schematic that illustrates relative position of a plug connector 302 and a receptacle connector 304 during an un-mating sequence according to an embodiment of the present invention. It is to be noted that only the relative positions that are applicable to the various embodiments described herein are shown. It should be noted that during a mating/un-mating sequence, plug connector 302 and receptacle connector 304 can have several other possible relative positions with respect to each other as plug connector 302 is inserted and/or removed from receptacle connector. However, not all of these relative positions are essential for the description of the embodiments herein and hence are omitted here for clarity.

As illustrated in FIG. 3, plug connector 302, e.g., of an accessory, includes one or more contacts 308. Contact 308 can be electrically (and in some instances physically) connected with contact 310 of connector 304. Connector 304 includes a housing 306 that may be grounded. When connector 302 is fully inserted into connector 304, contact 308 is in electrical connection with contact 310. Consider that contact 308 carries power for charging the host device associated with connector 304. In normal operation, the accessory charges the host device by transferring power from contact 308 to the internal circuitry of the host device via contact 310.

Consider that connector 302 is pulled out of connector 304 when the charging operation is still in progress. In this instance, contact 308 still has power (e.g., voltage) present on it. When connector 302 is being pulled away from connector 304, contact 308 on connector 302 may come in contact with housing 306 of connector 304 at point 314, effectively grounding the power on contact 308. This can result in arcing and may also possibly damage connector 302 and/or connector 304 and the host device to which connector 304 is coupled to. It would be desirable to terminate power on contact 308 as soon as possible after the electrical connection between contact 308 and contact 310 is severed so even if contact 308 touches housing 306, there would be no danger to connector 302 and/or connector 304 or the host device. The following detailed description provides some techniques to terminate power on a contact of a connector if the connector is disconnected from a host device.

Figure 4:
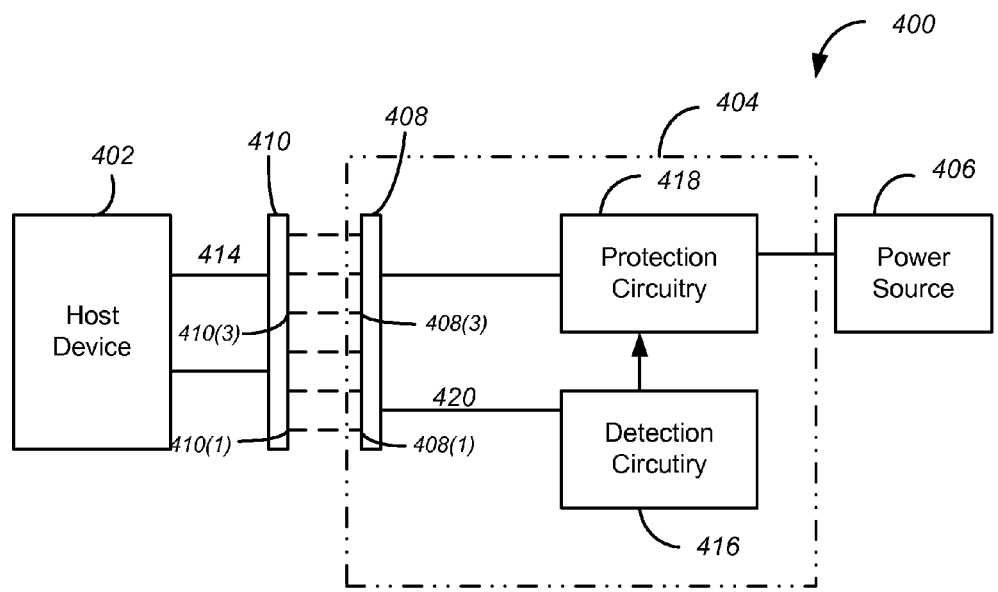
FIG. 4 is a simplified block diagram of a system for detecting removal of a connector according to an embodiment of the present invention.

In some embodiments, a plug connector may be used with an accessory that provides power to a host device. For example, the accessory may be a battery charger that may be connected to host device, e.g., a PC, a mobile phone, a media player, etc. In this instance, one or more contacts of the plug connector coupled to the accessory may have a voltage, e.g., 5V to 25+V, on it. FIG. 4 is a functional block diagram of a system 400 for detecting electrical decoupling of a connector and terminating power being provided via the connector, according to an embodiment of the present invention.

System 400 may include a host device 402 that receives power from an accessory 404. Host device 402 may be any electronic device such as a PC, a media player, a computing device, a mobile phone, a tablet computer, or the like. Accessory 404 can be a power adapter, battery charger, a cable, a docking station, or any other device that is capable of providing and/or carrying power to host device 402. In some embodiments, accessory 404 can be a cable that carries power from an power adapter to host device 402. Power source 406 may be part of accessory 404 or separate from accessory 404. In some embodiments, power source 406 may be a battery, a AC wall outlet, etc. Accessory 404 may include a transformer in some instances.

Accessory 404 may include a connector 408, e.g., connector 100 (or 101) of FIG. 1, that can be coupled to a corresponding connector 410, e.g., connector 200 of FIG. 2, associated with host device 402. Connector 408 may include one or more contacts that can be electrically coupled with contacts in connector 410 to create an electrical and communication link between host device 402 and accessory 404. In some embodiments, connectors 408 and 410 may have one or more contacts that carry power and additional contacts that carry data. As illustrated in FIG. 4, in one embodiment, contacts 408(3) and 410(3) may be the power contacts of connectors 408 and 410, respectively and contacts 408(1) and 410(1) may be the data contacts of connectors 408 and 410, respectively. Accessory 404 includes detection circuitry 416 that can detect a disconnection event between connector 408 and 410 and protection circuitry 418 that can regulate power being provided over the power contacts, based on input from detection circuitry 416. In some embodiments, detection circuitry 416 and protection circuitry 418 may be housed within the body of connector 408, e.g., housing 102 of connector 100 of FIG. 1. In other embodiments, either one of detection circuitry 416 or protection circuitry 418 may be included in connector 408.

During normal operation, accessory 404 may supply power to host 402 over power line 414 via a contact 408(3) of connector 408 that is in electrical connection with a corresponding contact 410(3) in connector 410. Now, if the electrical connection between contacts 408(3) and 410(3) is broken, e.g., by physically detaching connector 408 from connector 410 or by some other means, detection circuitry 416 of the accessory can detect the break in electrical coupling by monitoring communication/data line 420 (which may be coupled to host device 420, e.g., via contacts 408(1) and 410(1)) and send a signal to protection circuitry 418 indicating that the electrical connection has been severed. The details on how detection circuitry detects the break in the electrical coupling are described below. In response to this input from detection circuitry 416, protection circuitry 418 can terminate the power on contact 408(3) thus eliminating the possibility of arcing or damage to connector 408, connector 410, or any other device in system 400.

It is desirable that the power on contact 408(3) of connector 408 be terminated before that contact touches any grounded part of connector 410. Thus, the timing for terminating the power on the contact should be such that the power is cut off before the contact of connector 408 can present a hazard but after an electrical disconnection is confirmed. This means that the system needs to able to distinguish between transient loss of electrical connection and a more sustained loss of electrical connection. A transient loss of electrical connection may occur in instances where the electrical connection appears to be broken for a few microseconds but is quickly restored such as when connector 408 is moved/shaken when inside receptacle connector 410. A more sustained loss in electrical connection can occur when connector 408 is removed/separated from connector 410.

Communication/data line 420 between the host device and the accessory may have some parasitic capacitance that may build up as result of charging of the communication line during normal operation. In some embodiments, this parasitic capacitance may be between 300 pF and 900 pF. Thus, even if the communication line is electrically disconnected from the host device, the accessory may not record this disconnection until this parasitic capacitance is dissipated. For example, during normal operation, the communication/data line may be in a logic "high" state. In some embodiments, this may correspond to a logic "1" or be equivalent to the bus voltage, e.g., 3 volts. When the accessory is disconnected from the host, the communication/data line goes into a logic "low" or "0" state, e.g., 0 volts. However, even after the communication/data line goes into the "low" state, the accessory may not register the "low" state until the parasitic capacitance is completely dissipated, which could take several hundred microseconds in some instances. During the time the parasitic capacitance is dissipating, the accessory may continue to output power on contact 408(3) since it has not yet detected that connector 408 is no longer in electrical contact with connector 410. Thus, during this time if contact 408(3) touches any grounded object, it could result in arching and potential damage to connector 408 and or host device 402 and accessory 404.

Thus, the long dissipation time for the parasitic capacitance in the communication line may prolong the detection of an actual electrical disconnection event. Therefore, is it desirable to shorten the dissipation time so that a disconnection event can be quickly determined. In some embodiments, the communication/data line may go into the "low" state, e.g., for 1-5 microseconds, as part of normal data communication process. The detection circuit should also be able to distinguish between such "transient" lows and a more sustained "low", e.g., communication line being in the "low" state for 50 microseconds or greater, which might indicate a disconnection event.

Figure 5:
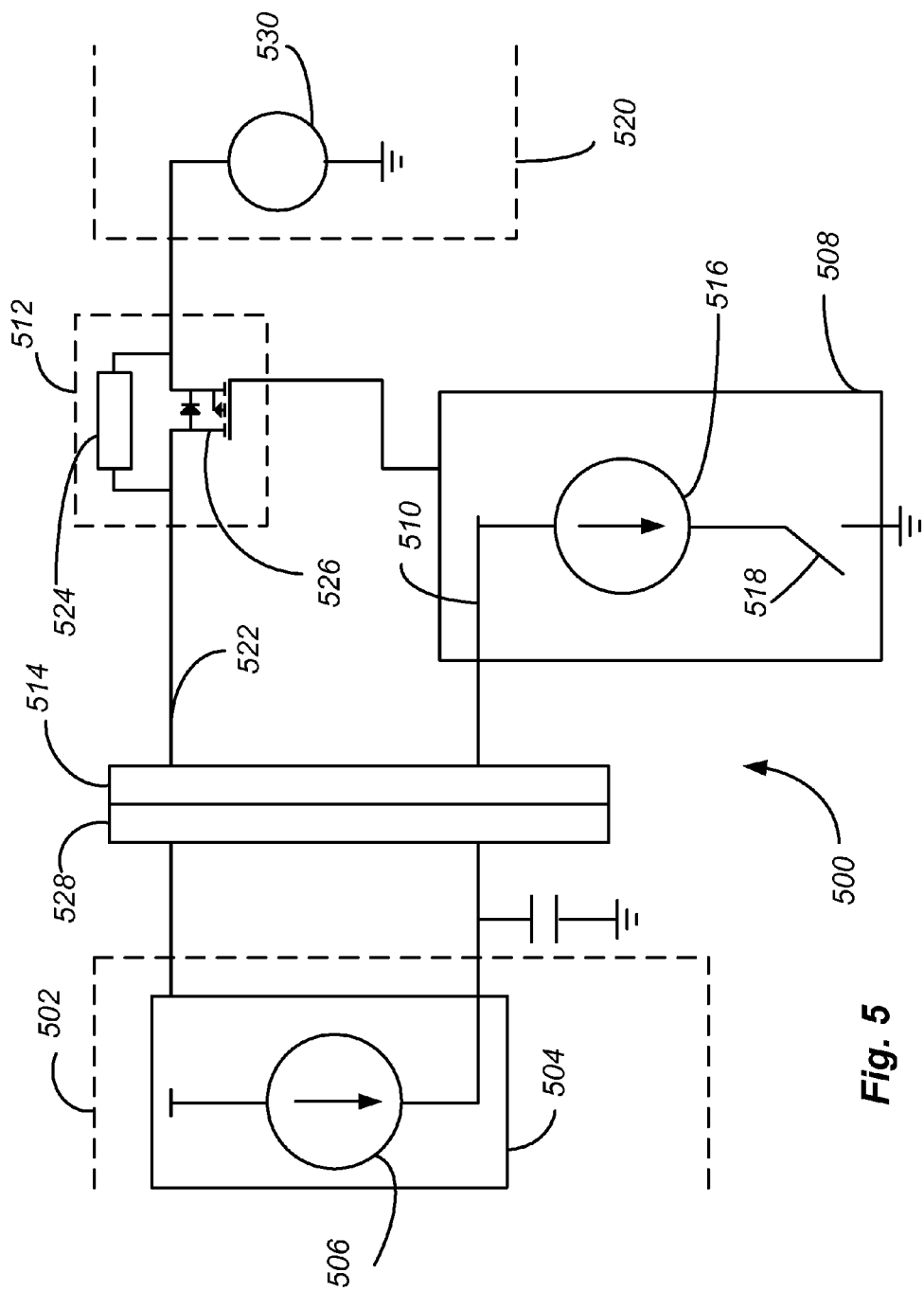
FIG. 5 is a functional block diagram illustrating a system for detecting removal of a connector and terminating power on the connector according to an embodiment of the present invention.

FIG. 5 is a functional block diagram illustrating various components of system 500 for detecting an electrical disconnection event and terminating power to the connector according to an embodiment of the present invention.

System 500 includes a host device 502, which is similar to host device 402 of FIG. 4. Host device 502 includes a microcontroller 504. Microcontroller 504 includes a current source 506 that provides a constant current when microcontroller 504 is active. Current source 504 is coupled to a detection unit 508 via contacts in connectors 528 and 514 and a communication line 510. Microcontroller 504 is also coupled to a protection unit 512 via a power line 522. Protection unit 512 may be connected to a voltage/current source 530 that provides the power for host device 502. In some embodiments, protection unit 512 and detection unit 508 may be part of accessory 520. In other embodiments, protection unit 512 and detection unit 508 may be separate from accessory 520. In some embodiments, where the accessory is a cable, protection unit 512 and detection unit 508 may be part of the cable assembly.

Detection unit 508, which can be implemented as a single integrated circuit or multiple integrated circuits, includes circuitry for detecting whether connector 514 has been electrically disconnected from connector 528 of host device 502. Detection unit 508 includes a current sink 516 coupled to a switch 518. Current sink 516 helps with dissipating the parasitic capacitance of communication line 510. In some embodiments, current sink 516 is activated when switch 518 is activated thereby coupling communication line 510 to ground via current sink 516. In some embodiments, current sink 516 provides between 50 µA and 100 µA of current sink capability.

Protection unit 512, which can be implemented as a single integrated circuit or multiple integrated or discrete circuits, includes circuitry for regulating current/voltage on power line 522. In some embodiments, protection unit 512 includes a regulated current source 524, e.g., a Low Drop-Out (LDO) regulator, connected in parallel with a transistor 526, e.g., a FET. Regulated current source 524 outputs a constant current regardless of input voltage received from source 530. In some embodiments, regulated current source 524 is configured to deliver a low current on power line 522, e.g., 15 mA or less, regardless of an input voltage provided by source 530. Thus, in effect, current regulated current source 524 presents a high-resistance path for current flow within protection unit 512. Transistor 526 acts as a switch and presents a low resistance path for the current within protection unit 512. Thus, during normal operation, e.g., when accessory 520 is used for charging host device 502, initially transistor 526 is turned off and regulated current source 524 outputs a low current on power line 522. Once the communication between accessory 520 and host device 502 establishes that accessory 520 is authorized for use with host device 502, transistor 526 is turned on thus enabling the low-resistance path thereby coupling the incoming voltage to host device 502 via the power line 522.

As described above, if connector 514 is unmated from connector 528 in middle of a charging operation, the contact in connector 514 associated with power line 522 may still have the full voltage provided by source 530. In order to prevent any damage due to this voltage on the contact, system 500 acts to terminate power on that contact in the event of a disconnection between the accessory and the host device.

Figure 6:
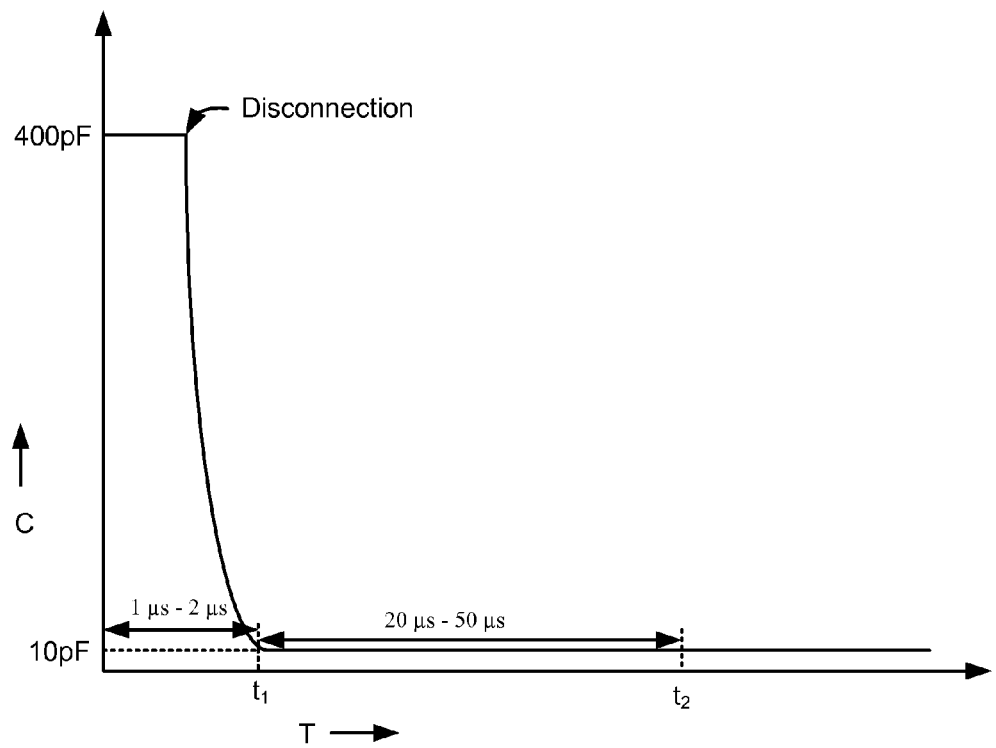
FIG. 6 is a graph illustrating timing information associated with detection of a disconnection event according to an embodiment of the present invention.

FIG. 6 is a graph illustrating the various stages of operation of system 500 during a disconnection event according to an embodiment of the present invention. During regular communication between the host device and the accessory, communication line 510 is in a logic "high" state. If communication line 510 transitions from the logic "high" state to a logic "low" state, detection unit 508 detects this change in state of communication line 510 and closes switch 518. As a result, the parasitic capacitance built into communication line 510 rapidly dissipates by time $t_1$. In some embodiments, the amount of time taken to dissipate the parasitic capacitance may be between 1 μs and 2 μs. Detection unit 508 then starts a counter at time $t_1$ to determine the time duration for which communication line 510 is in the low state. When the counter reaches a predetermined time $t_2$, and the communication line is still in the logic "low" state, detection unit 508 concludes that connector 514 has been electrically disconnected from connector 528 and generates a signal for protection unit 512 at time $t_2$. In some embodiments, time duration $t_2$ may be between 20 μs and 25 μs. In some embodiments, it may take up to 50 μs for detection unit 508 to register the disconnection event. In other words, $t_2$ may be up to 50 μs.

Upon receiving the signal from detection unit 508, protection unit 512 turns transistor 526 off and enables the high-resistance current path via regulated current source 524. This results in power line 522 now having the low regulated current, e.g., about 15 mA as described above. Thus even if the power-bearing contact of the connector 514 touches a grounded surface, no harm is likely to result since the contact has very low current on it. In some embodiments, the low regulated current may be about 0 A. In some embodiments, protection unit 512 may take between 10 μs and 50 μs to actually switch the current path. Thus, in some embodiments, the total time to terminate power on the power contact of connector 514 can be between 50 μs and 100 μs from the time connector 514 is electrically disconnected from connector 528.

Figure 7:
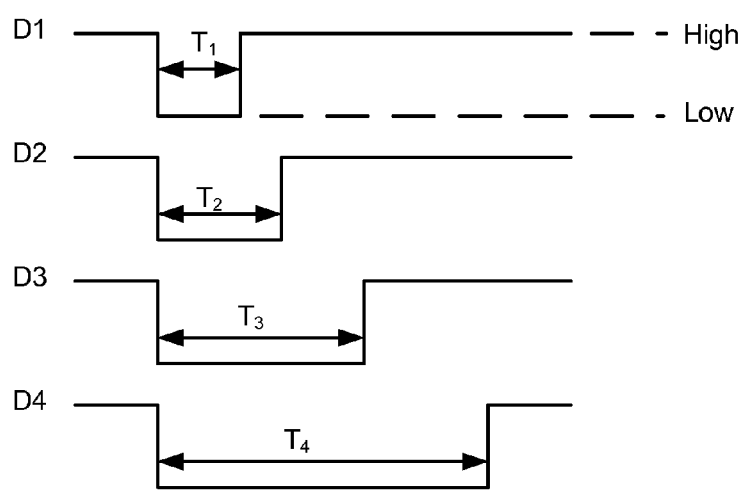
FIG. 7 illustrates some exemplary signals that may be communicated over the communication line between the host device and the accessory according to an embodiment of the present invention.

As described above, communication line 510 carries data back and forth between the accessory and the host device. In some embodiments, the data is transmitted in form of data pulses. Each data pulse has a certain pulse width that corresponds to a length of time for which the data is transmitted. The accessory, and more particularly the detection unit, is configured to distinguish between these different data pulses and a signal generated when there is a disconnection event. This is done to eliminate the possibility of the accessory detecting "false" disconnection events. FIG. 7 illustrates several exemplary data pulses D1-D4 that carry specific information between the accessory and the host device. Each data pulse is characterized by associated pulse widths that correspond to the times $T_1$-$T_4$ of the data pulses. Also, each data pulse has a first "high" state and a second "low" state. Thus, every time data is transmitted (or received) over the communication line, the status of the communication line may transition from "high" to "low" and when data transmission is finished, the communication line may return to the "high" state.

For example, data pulse D1 may be used to transmit a logic "1" to the accessory and may have a pulse width/duration of $T_1$. Data pulse D2 may be used to transmit a logic "0" and may have an associated duration of $T_2$. Data pulse D3 may be used signal the start and/or end of a transmission and may have an associated duration $T_3$, and data pulse D4 may be used to transmit a wake pulse for e.g., waking up the accessory from a sleep mode, and may have an associated duration $T_4$. As illustrated in FIG. 7, $T_4 > T_3 > T_2 > T_1$; however this is just one example and one skilled in the art will realize that various other data pulses with varying pulse duration can be used based on the specific design of the host device and the accessory. In our example above, $T_4$ is the longest duration as illustrated in FIG. 7.

As described above, the detection unit monitors the communication line and determines that a disconnection event has occurred when the communication line transitions from a "high" state to a "low" state. It is beneficial to distinguish between a disconnection event and transmission of one of the above-mentioned data pulses. Otherwise the detection unit may register a disconnection event even when one of the data pluses mentioned above is sent by the host device. Thus, in order for the accessory to conclude that a disconnection event has occurred, a time duration for which the communication line remains in the "low" state (e.g., threshold time $T_h$) has to at least exceed $T_4$. This will likely ensure that the detection unit does not mistakenly detect disconnection when any of the data pulses are sent. Thus, in the example illustrated in FIG. 7, $T_h = T_4$ and the time for which the communication line remains low must be more than $T_4$ in order for the detection circuitry to consider the possibility that a disconnection event may have occurred. In some embodiments, the threshold time $T_h$ may be greater than the longest duration pulse used by the accessory during data transmission in order to account for errors. For example, in one embodiment, the threshold time may be 2-10 microseconds (μs) longer than the longest duration for a data pulse communicated between the accessory and the host device. Thus, continuing the above example, in this particular instance $T_h = T_4 + 2 - 10$ microseconds. In another embodiment, the threshold time $T_h$ may be set at 5-20 microseconds more than the longest duration pulse.

Continuing the example from above, the detection unit will start a counter once the state of the communication line changes to logic "low" and increment the counter at least beyond time $T_4$, before the detection unit sends a signal to the protection unit. In some embodiments, time $T_4$ can be up to 25 μs. It is to be noted that the data pulses in FIG. 7 are for illustration purposes only. One skilled in the art will realize that several other types of data pulses/signals may be communicated over the communication line. As long as the accessory waits for the duration of the "low" state of the communication line to exceed the longest data pulse duration that can occur during normal communication between the accessory and the host device before it sends a signal to the protection unit, all such implementations will come under the purview of the techniques described herein.

Figure 8:
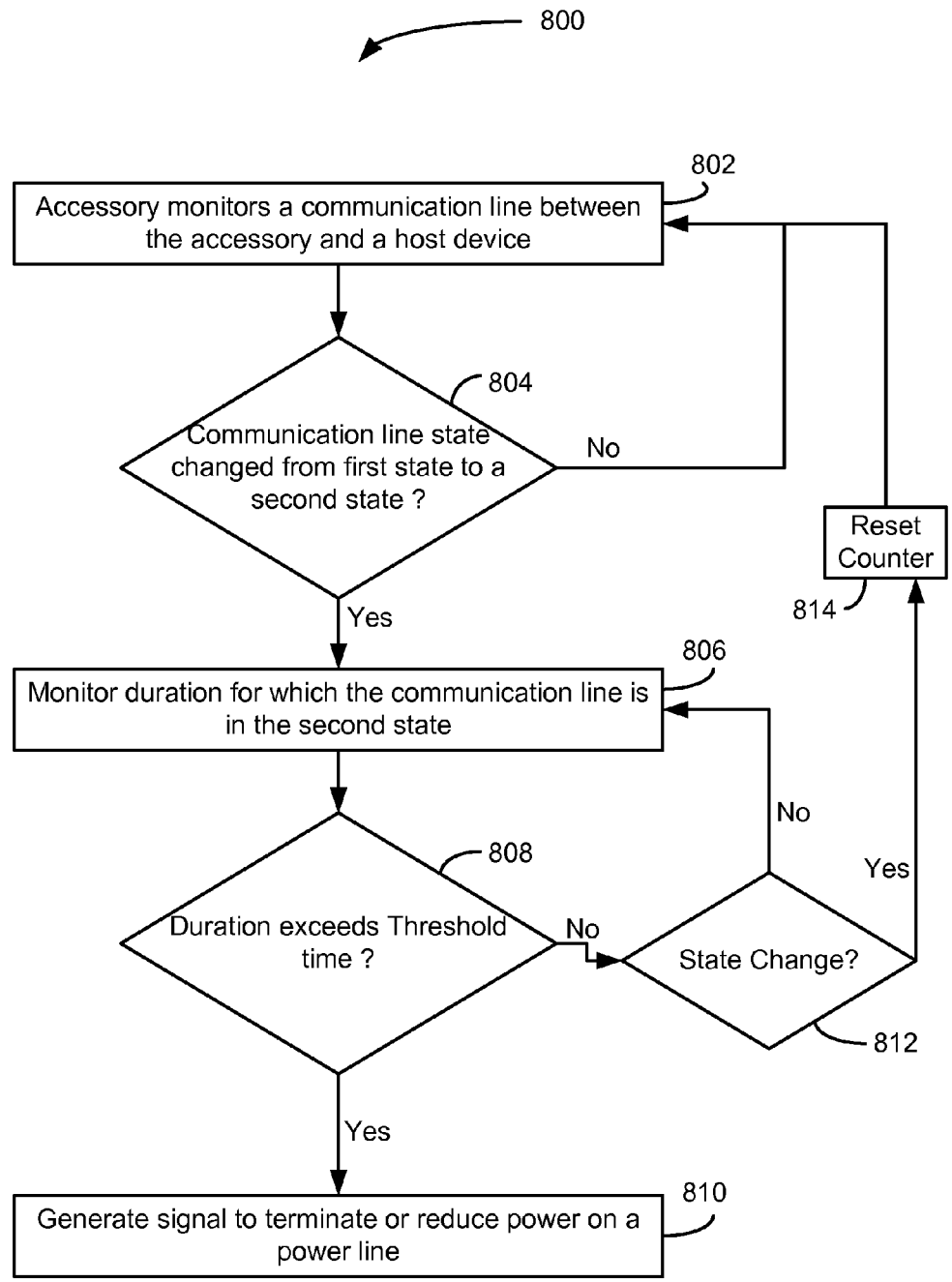
FIG. 8 is a flow diagram of a process for detecting disconnection of a connector according to an embodiment of the present invention.

FIG. 8 is a flow diagram of a process 800 for terminating/reducing power available on a connector according to an embodiment of the present invention. Process 800 may be performed by, e.g., accessory 404 of FIG. 4. Process 800 assumes that the accessory provides power to the host device via a power line between the accessory and the host device and that a connector associated with the accessory has at least one contact that carries the power from the accessory to the host device.

Process 800 can begin after the connector of the accessory is mated to a connector of a host device resulting in an electrical connection being established between them. At step 802, the accessory can monitor a communication line between the accessory and a host device. At step 804, the accessory can detect whether a state of the communication line has changed from a first state, e.g., logic "1" to a second state, e.g., logic "0". If the state of the communication line has not changed, process 800 can return to step 802. If it is determined that the state of the communication line has changed from the first state to the second state, the accessory can start counting a time duration for which the communication line is in the second state (step 806). At step 808, the accessory can check whether the time duration for which the communication line is in the second state has exceeded a threshold time, e.g., time for longest data pulse that can occur during normal communication between the accessory and the host device.

If the time duration has not exceeded the threshold time, the accessory can check whether the state of the communication line has changed back to the first state at step 812. If the communication line is still in the second state, process 800 can return to step 806 and the accessory can continue to monitor the communication line. If at step 812 it is determined that the communication line has changed state, e.g., the communication line is now in the first state, the counter can be reset at step 814 and the process 800 can return to step 802. This can occur in case of transient loss in electrical connectivity or sending of a data pulse, as described above. If the time duration exceeds the threshold time as determined at step 808, the accessory can conclude that the accessory has been electrically disconnected from the host device and generate a signal for the protection circuit at step 810. The signal informs the protection circuit that the connector is disconnected and in response to the signal, the protection circuit terminates or reduces power on the power contact of the accessory connector thereby termination or reducing power to the host device.

It should be appreciated that the specific steps illustrated in FIG. 8 provide a particular method of detecting disconnection of a connector according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

In some embodiments, instead of regulated current source 524, protection unit 512 may include a fixed resistor in parallel to transistor 526. The value of the fixed resistor may be chosen such that when the current path through the resistor is enabled, it provides a low current through the power line/contact of the plug connector of the accessory. In some embodiments, the value of the resistor can be between 100Ω and 2 KΩ. In other embodiments, protection unit 512 may include a switch in series with a resistor. In this embodiment, if the input voltage to the protection unit exceeds a certain value, e.g., 25 volts, the switch is opened to prevent any power from being transferred to the contact of the plug connector thus protecting the plug connector and the host device.

Figure 9:
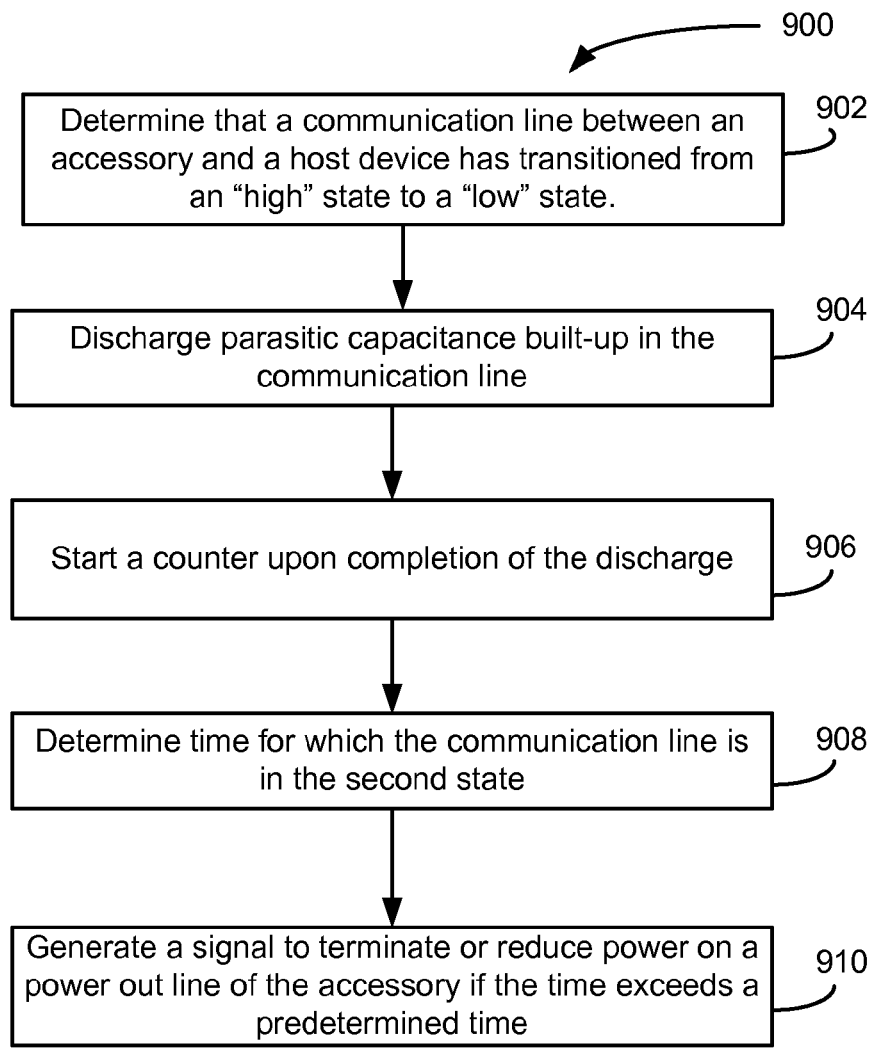
FIG. 9 is a flow diagram of a process for detecting disconnection of a connector according to another embodiment of the present invention.

FIG. 9 is a flow diagram of a process 900 for terminating power to a connector according to another embodiment of the present invention. Process 900 can be performed, e.g., by detection unit 506 of FIG. 5.

Initially the plug connector of the accessory may be connected to corresponding receptacle connector of the host device. In this instance, the accessory can supply power to the host device, e.g., the accessory is charging a battery of the host device, via power line between the accessory and the host device. As described above, during normal operation, data is exchanged between the host device and the accessory via at least one communication line. As part of the normal operation, the communication line may change its state from "high" to "low" depending on whether data is transmitted over the communication line. In some embodiments, the communication line is in the "high" state or is in a "charged" state whenever data is not being transmitted. When some instruction/data is to be communicated between the host device and the accessory, a data pulse is transmitted over the communication line that may result in the communication line temporarily changing to the "low" state for the duration of the pulse. Thereafter, the communication line may again revert back to the "high" state. In the event of a disconnection of the plug connector, this communication link is severed and the accessory sees the communication line as being in the "low" state for the duration of the disconnection.

The detection unit/circuitry can continuously monitor the communication line to determine whether it is in a "high" state or a "low" state. In this embodiment, the first state corresponds to logic "high" and the second state corresponds to logic "low." The detection unit can then detect that the communication line has transitioned from a "high" state to a "low" state (block 902). Based on the detection, the detection unit can enable a current sink within the accessory to dissipate the built up parasitic capacitance in the communication line (block 904). Once the capacitance is dissipated, the detection unit can start a counter to determine a time period for which the communication line is the "low" state (block 906). Next, the detection unit can determine, based on the counter, a time period for which the communication line is the "low" state (block 908).

As described above, there are several instances when as part of normal data communication between the accessory and the host device, the communication line may go into the "low" state. The counter is useful in preventing a false detection of disconnection. When the counter exceeds a certain predetermined threshold time value $T_h$, e.g., 25 us, the detection unit can conclude that the reason that the communication line is in the low state is because the accessory connector is disconnected from the host device. Based on this conclusion, the detection unit may generate a signal that instructs a protection unit to terminate or reduce the power being supplied to the host device (block 910).

It should be appreciated that the specific steps illustrated in FIG. 9 provide a particular method of terminating power on a connector according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives. For instance, In some embodiments, the counter may be started immediately upon detecting that the communication line is in the "low" state without waiting for the parasitic capacitance to be discharged.

In an alternative embodiment, the accessory may be programmed to cut off power to the host device every time the communication line transitions to a "low" state regardless of whether a threshold time has been exceeded. This will ensure fast power cutoff without the needed for dissipating the parasitic capacitance and/or using a counter. However, in this embodiment, power may frequently cycle 'on' and 'off' since the communication line may frequently transition from the "high" to the "low" state as part of normal operation of the accessory.

Figure 10:
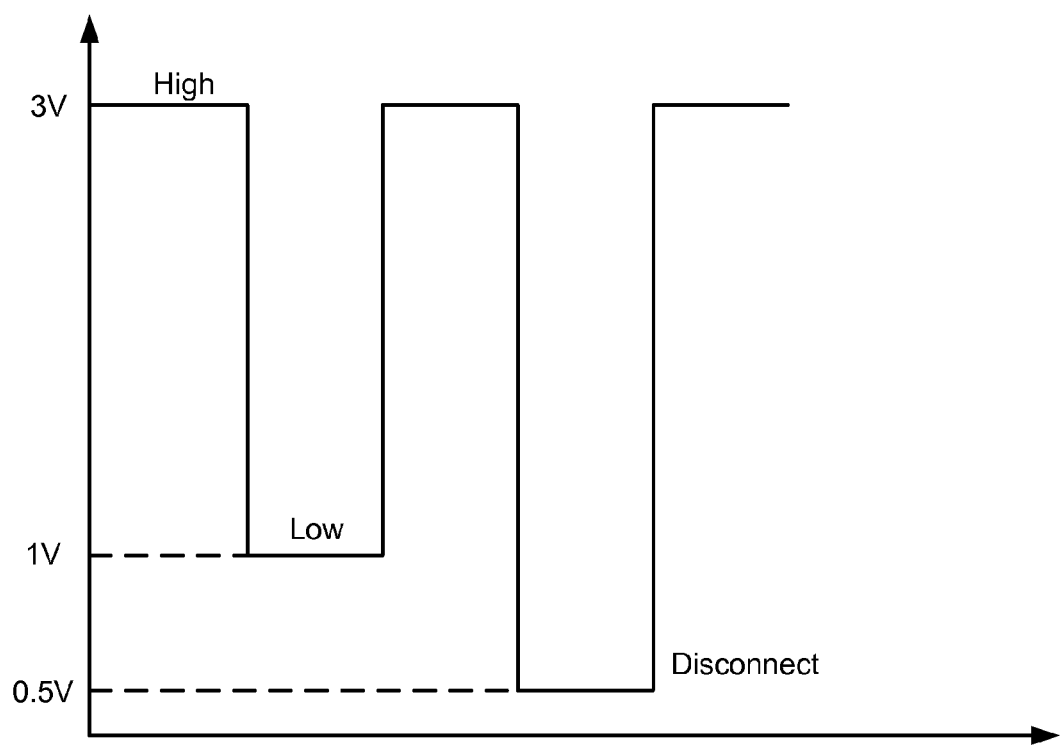
FIG. 10 is graph illustrating operational information for detecting disconnection of a connector according to yet another embodiment of the present invention.

In another embodiment, a separate logic level may be defined for a disconnection event, which may be different from the "high" state and the "low" state described above. FIG. 10 illustrates this concept. As shown in FIG. 10, consider that the max amplitude of any data pulse does not exceed about 3 V. In this instance, 3 V can be designated as being equivalent to a logic "1" or "high" state. However, instead of designating 0 V as the logic "0" or "low" state, a different voltage, e.g., 1 V, may be designated as the logic "0" for the data pulse. A third voltage, e.g., 0.5 V, may be designated as the "disconnect" state. Of course, the logic circuitry within the host device and the accessory will need to be designed to generate and recognize these three levels for the communication line. In this embodiment, the detection circuit can monitor the communication line as described above. However, the detection circuit will only conclude that a disconnection event has occurred if it determines that the communication line is in the special "disconnect" state and not merely in the "low" state. This may eliminate the need for the counter, the need for defining a threshold time, etc. thus simplifying the detection process. In this instance, whenever the communication line transitions to the "disconnect" state, the accessory can immediately terminate the power on the power line without any further checks or verification.

In another embodiment, an incoming power pin on the host device connector can be monitored to detect whether the accessory connector is still connected. As long as a voltage or current is present on the incoming power pin of the host device connector, it can be assumed that the accessory connector is still connected to the host. If no current or voltage is present on the incoming power pin, then it can be concluded that the accessory connector has be disconnected.

In yet another embodiment, a contact or contacts on the accessory connector, e.g., connector 100 of FIG. 1A, can be designed to provide a disconnect signal. For example, one contact in the accessory connector can be set back or recessed from all other contacts. This contact can be designed such that it makes physical (and/or electrical) connection with a corresponding contact in the host device connector at the very end of the connector mating sequence, e.g., as the accessory connector is being mated with the host device connector. Also this contact can be designed such that it physically (and/or electrically) disconnects from the corresponding host device contact before any other contacts of the accessory connector physically and/or electrically disconnect from the host device connector contacts. Thus, this contact can be a "last to connect" but "first to disconnect" type contact. Each time this contact connects to the host device connector, a signal can be sent to the accessory via one of the other contacts to inform to the accessory that all contacts of the accessory connector are in physical contact with their corresponding contacts in the host device connector. This signal can be used by the accessory to turn on power to the host device. This will ensure that power is turned on when the accessory connector is securely connected to the host device.

During un-mating of the connectors, this designated contact will disconnect first from the host device connector. Once disconnection of this contact is detected, the host device can send a signal to the accessory over one of the other contacts that is still electrically coupled to the host device, e.g., the communication line described above, to cut off power to the accessory connector. Thus, as soon as the physical (and/or electrical) connection between the designated contact and the host device is severed, the power supplied via the accessory connector can be terminated while the rest of contacts of the accessory connector are still mated to the contacts of the host device connector. This will prevent any possibility of shock/arcing by the accessory connector even if the accessory connector is subsequently completely separated from the host connector.

As described above, the communication line can transition into the "low" state as part of the normal operation of the accessory. When the communication line transitions to the "low" state during normal operation, in most instances it is the host device that causes this transition since the host device is sending information to the accessory over the communication line. Thus, it may be beneficial to determine the cause of the communication line transitioning to the "low" state. This may be helpful in determining whether the transition of the state of the communication line is part of normal data communication operation or as a result of a disconnection event.

Figure 11:
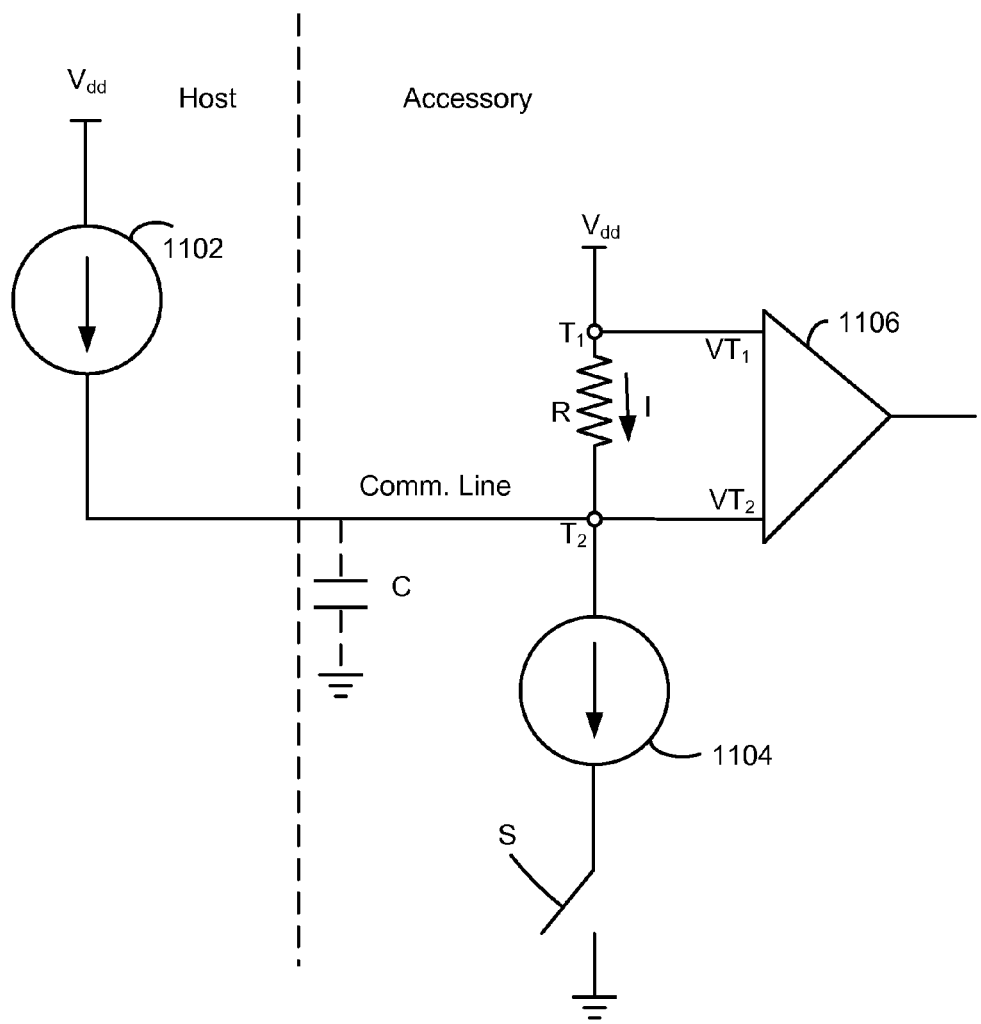
FIG. 11 is a schematic illustrating a system for detecting disconnection of a connector according to still another embodiment of the present invention.

FIG. 11 illustrates a schematic that can be used to determine the cause for the communication line to transition to the "low" state according to an embodiment of the present invention. On the host device side, there may be a current source 1102 that may supply a contact current, e.g., 4 mA, via the communication line. On the accessory side, the communication line may be connected to a resistor R, which in turn is connected to supply voltage $V_{dd}$. The communication line is also connected to a current sink 1104 that may have a switch S in series. Voltage can be measured at two points $T_1$ and $T_2$. These voltages can be inputs to a comparator 1106. The parasitic capacitance in the communication line is designated as 'C'.

In normal operation when the accessory connector is plugged into the host device connector, the communication line is in a high state and there is a known voltage that can be measured at point $T_2$. When the communication line is in the "high" state, the voltage at point $T_2$ can be given by the equation $$VT_2 = V_{dd} - (I*R) \quad (1)$$

Where $V_{dd}$ is the supply voltage and I*R is the voltage drop across the resistor R.

When the host device causes the communication line to transition to the "low" state (i.e. host device transmits a data pulse on the communication line), the total current flowing in the resistor R will be the sum of currents provided by current source 1102 and current sink 1104. For example, consider that current source 1102 can provide 4 mA of current and current sink 1104 can provide 100 μA of sink capacity. Thus, in this instance, $V_{T2}$ can be given by the equation $$VT_2 = (100 \ \mu A + 4 \ mA)*R \quad (2)$$

Now if the accessory connector is disconnected from the host device, it effectively eliminates the input from current source 1102. In this instance $V_{T2}$ can be expressed as $$VT_2 = 100 \ \mu A * R \quad (3)$$

Thus voltage measurements at point $T_2$ will be different depending on whether the host device causes the communication line to transition to the "low' state or whether disconnection causes the communication line to transition to the "low' state. Thus by measuring $V_{T2}$ a determination can be made whether the accessory connector has been disconnected from the host device. For example, Table 1 below provides the three possibilities. The voltages at the two points $VT_1$ and $VT_2$ can be provided as inputs to comparator 1006 that can output a corresponding current value based on the comparison.

TABLE 1

| Communication line State | $VT_2$ | Conclusion |
|---|---|---|
| High | $V_{dd} - (I * R)$ | Accessory connector plugged in to the host device |
| Low | $(100 \mu A + 4 mA) * R$ | Host device pulled the communication line "low." Not a disconnection event. |
| Low | $100 \mu A * R$ | Disconnect event |

Figure 12:
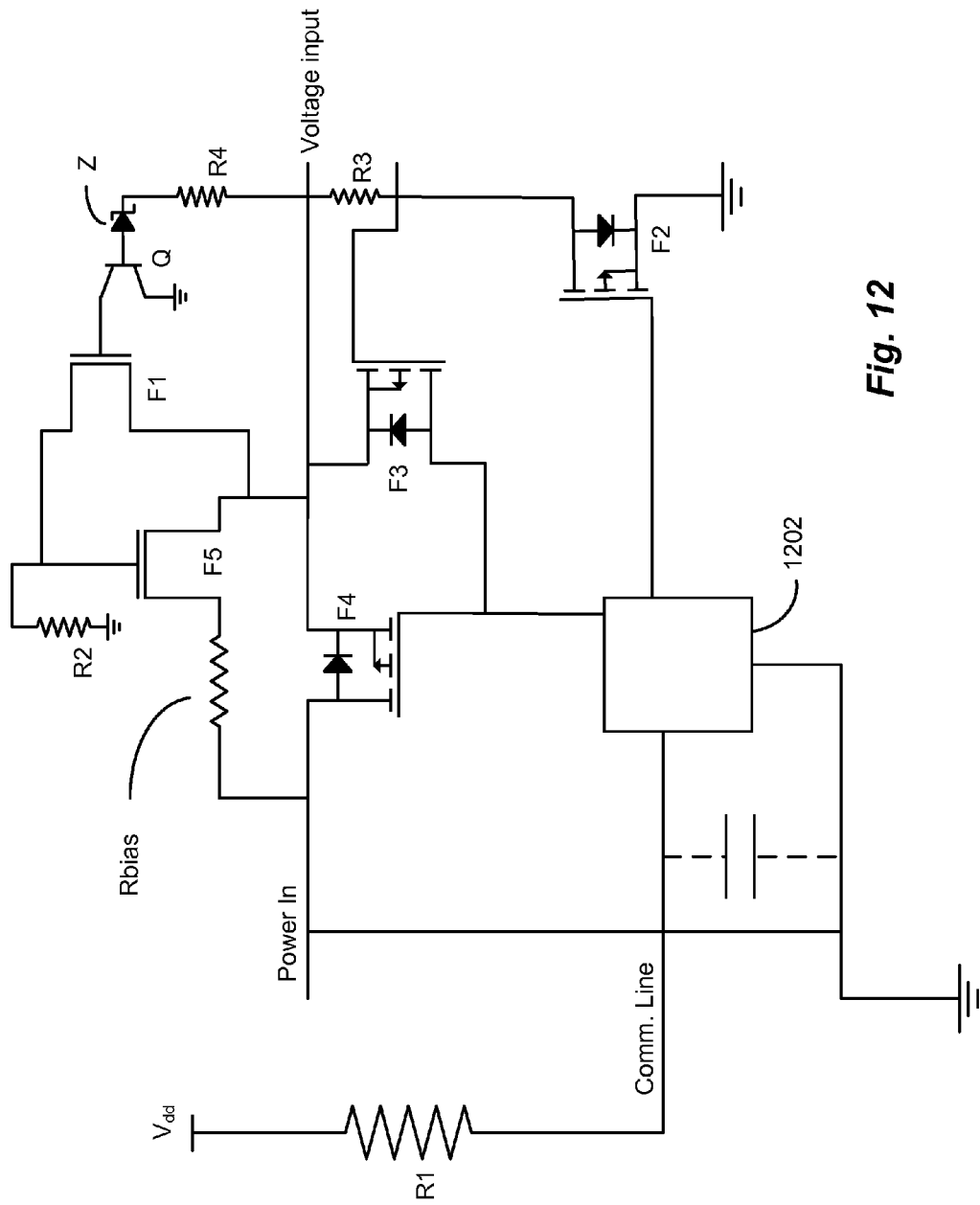
FIG. 12 is a schematic illustrating a system for detecting disconnection of a connector and for protecting an accessory according to another embodiment of the present invention.

FIG. 12 is a schematic for a system 1200 for detecting disconnection of an accessory connector from a host connector and terminating power on the accessory connector according to another embodiment of the present invention.

In operation, when a accessory (plug) connector is electrically connected to a host device connector, the incoming power over the "power in" line is provided to the host device via pFET F4. In other words, when the plug connector is connected to the host device, pFET F4 is turned on when detection unit 1202 pulls the gate of pFET F4 to a voltage ($V_G$) that is higher than a threshold voltage ($V_{TH}$). In this instance, pFET F4 acts as a switch and provides a low resistance path for the incoming power over the "power in" line.

When detection unit 1202 detects disconnection of the plug connector from the host device, e.g., using any of the techniques described above, it sends a signal to FET F3 such that F3 clamps the source and gate of F4 together. This turns off F4. As a result, the incoming power is now routed through the high resistance path via $R_{bias}$. The value of the resistor $R_{bias}$ is selected so as to provide a low current, e.g., 15 mA, on the 'power in' line when the high resistance path is enabled. Thus, the plug connector can be protected in the instance if it is disconnected when the incoming power still active.

In some embodiments, the accessory may be a cable that carries power from a power adapter to the host device. The cable may have a maximum voltage/current rating that it can handle. In some embodiments, during normal operation when the cable is carrying power from the power adapter to the host device, the voltage outputted by the adapter may suddenly exceed the maximum rating of the cable, e.g. if the adapter malfunctions. In this instance, there is a danger that the cable may burn or otherwise get damaged due to the excessive power. The scheme illustrated in FIG. 12 protects the cable from getting damaged in case of sudden and unexpected increase in the incoming voltage.

In this instance, the Zener diode 'Z' can be rated based on the maximum current that can be allowed to be carried by the cable. This maximum current can be based on the characteristics of the cable, the design of the host device, tolerance values acceptable for the accessory and the host device, etc. For instance, Zener Z can be rated for 6 V. In this example, as long as the incoming voltage is less than 5V, the zener diode Z is in an off or non-conducting state. This turns FET F5 on and enables power to pass via the high resistance path.

Now, if the voltage input or the incoming voltage exceeds 6 V, Zener Z starts conducting thereby biasing the gate of transistor Q. This results in the transistor Q turning on and consequently biasing the gate of transistor F1 and turning on F1. When transistor F1 turns on, it clamps the gate and source of transistor F5 thus turning off transistor F5 and disabling the high resistance path through $R_{bias}$. Since FET F4 is normally in an "off" state by default, the turning off of transistor F5 shuts down the entire power path and thus no current can flow through the cable. This serves to protect the cable from overheating or getting damaged due to high current that may result due to the higher than expected incoming voltage.

It is to be noted that the value for the zener diode Z mentioned above is for illustration purposes only. One skilled in the art will realize that the zener diode Z can be chosen based on the requirement for the system and can be any suitable value. In some embodiments, the value of the zener diode Z may depend on the accessory's or host devices' tolerance level for incoming power.

Figure 13:
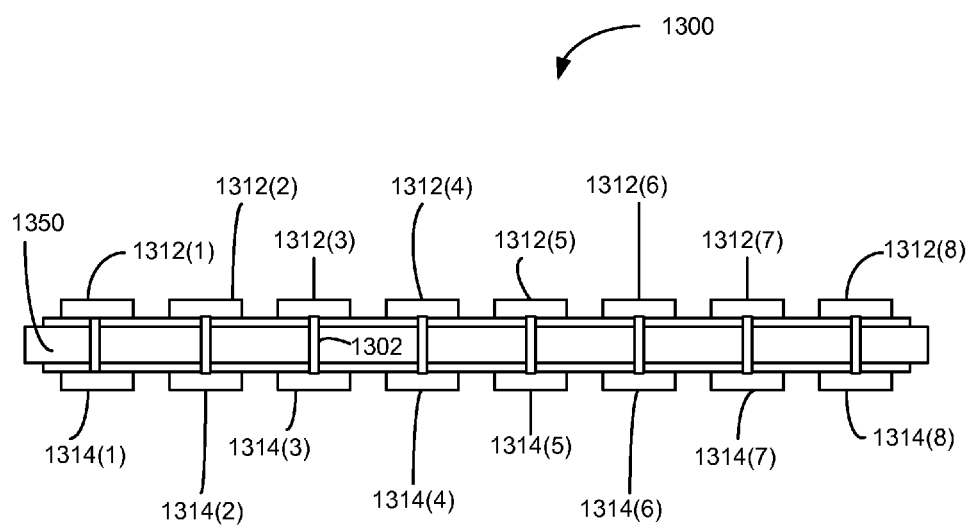
FIG. 13 is a cross-sectional view of a plug connector according to a particular embodiment of the present invention.

FIG. 13 is a cross-sectional diagram of a plug connector 1300 according to a particular embodiment of the present invention. Plug connector 1300 is similar to plug connector 100 of FIG. 1D. Plug connector 1300 has eight contacts 1312(1)-1312(8) mounted on a top surface of a PCB 1350 and eight contacts 1314(1)-1314(8) mounted on a bottom surface of PCB 1350. Each contact on the top side is electrically connected or "shorted" with an opposing contact on the bottom side by an electrical path 1302. For example, contact 1312(1) is electrically connected with contact 1314(1) as illustrated in FIG. 13. In some embodiments, electrical path 1302 can be a via. Thus, by shorting two opposing contacts, connector 1300 has the ability to be mated with a corresponding receptacle connector in either a first orientation or a second orientation.

In the particular embodiment illustrated in FIG. 13, either of contacts 1312(1) or 1312(8) can be coupled to the communication line or the power input line in one orientation. In other words, contact 1312(1) can either be coupled to the communication line described above or coupled to the power output line of the host device and serves to receive power from the host device and provide the power to the accessory device in instances where the accessory does not have its own power source, e.g., un-powered accessory. Similarly, contact 1312(8) can be coupled either to the communication line or to the power output line. For example, if contact 1312(1) is coupled to the communication line then contact 1312(8) will be coupled to the power output line and vice versa.

In a different orientation, contacts 1314(1) and 1314(8) may provide similar functionality as that of contacts 1312(1) or 1312(8), respectively.

In the particular embodiment illustrated in FIG. 13, contacts 1312(2), 1312(3), 1312(6), and 1312(7) can all carry data signals when plug connector 1300 is inserted in a first orientation. Similarly, contacts 1314(2), 1314(3), 1314(6), and 1314(7) can all carry data signals when plug connector 1300 is inserted in a second orientation that is 180 degrees rotated from the first orientation. In some embodiments, the data signals are differential data pairs. In other embodiments, the data signals may include UART data, USB data, digital audio data, digital video data, and the like. Contacts 1312(4) and 1312(5) carry power (i.e. power input) to the host device in the first orientation and contacts 1314(4) and 1314(5) carry power to the host device in the second orientation. Thus, if connector 1300 is electrically disconnected from the host device, the accessory can terminate/reduce power on contacts 1312(4) and 1312(5) or 1314(4) and 1314(5), depending on the orientation of connector 1300, using any of techniques described above.

It is to be understood that FIG. 13 only illustrated a particular layout for the plug connector. One skilled in the art will readily realize that other layouts for the plug connector are possible based on the application for which the plug connector is to be used. For example, instead of the contacts on the top and bottom being shorted as illustrated in FIG. 13, all contacts can be electrically isolated from each other.

Circuits, logic modules, processors, and/or other components can be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various non-transitory computer readable storage media; suitable media include magnetic disk or tape, optical storage media, such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for detecting decoupling of a first connector from a second connector, wherein the first connector is associated with an accessory and the second connector is associated with a host device, the first connector including a first contact for coupling a communication line between the accessory and the host device and a second contact for coupling a power line between the host device and the accessory, wherein the first contact is configured to carry commands and data between the accessory and the host device as part of a normal data communication process and the power line is configured to carry power from the accessory to the host device, the method comprising:
    while the first connector is coupled to the second connector and the first contact is physically coupled to a contact in the second connector, monitoring, by a detection circuitry in the accessory, the communication line, wherein the communication line is configured to be either in a first state or a second state;
    detecting, by the detection circuitry, that the communication line has changed from the first state to the second state;
    determining, by the detection circuitry in the accessory, a time duration for which the communication line is in the second state;
    determining, by the detection circuitry, that the time duration exceeds a threshold time;
    reducing, by a protection unit within the accessory, power on the second contact of the first connector.

2. The method of claim 1 wherein the first state corresponds to logic "high" and the second state corresponds to logic "low".

3. The method of claim 1 wherein data transmission between the accessory and the host over the communication line is in the form of data pulses between high and low states and the threshold time is greater than the data pulse widths associated with data transmission between the accessory and the host and transmitted or received over the communication line.

4. The method of claim 1 wherein the threshold time is between 20 µs and 50 µs.

5. The method of claim 3 wherein the threshold time is at least 2 microseconds more than a time of a longest data pulse used during communication between the accessory and the host device.

6. The method of claim 1 wherein the protection unit comprises a current limiting device connected in parallel with a transistor and wherein the protection unit is disposed in series with the power line.

7. A method for terminating power provided via a first connector of an accessory to a host device, wherein the first connector includes a first contact that physically couples a data line between the accessory and the host device and is configured to carry commands and data between the accessory and the host device as part of a normal data communication process and a second contact that physically couples a power line between the accessory and the host device, the method comprising;
    providing, by the accessory, a first current over the power line,
    monitoring, by the accessory, the data line to determine whether the data line changes from a first 'logic high' state to a second 'logic low' state;
    if the data line has changed from the first state to a second state, enabling, by the accessory, a current sink in the accessory to discharge parasitic capacitance of the data line;
    determining, by the accessory, a time duration for which the data signal line remains in the second state;
    if the time duration exceeds a predetermined threshold time that is longer than a time period that the data line is pulled low during normal data communication over the line, providing, by the accessory, a second current on the power line, wherein the second current is lower than the first current.

8. The method of claim 7 wherein the predetermined threshold time is between 20 µs and 50 µs.

9. The method of claim 7 wherein providing the second current on the power line further comprises instructing a protection unit within the accessory to enable a first power path for the power line, the first power path having a first resistance path, wherein the protection circuit further comprises a second power path having a second resistance lower than the first resistance.

10. The method of claim 7 wherein the threshold time is at least 2 microseconds more than a time of a longest data pulse used during communication between the accessory and the host device.

11. An accessory comprising:
    a first connector configured to connect to a second connector of a host device, the first connector having at least a first contact that, when physically connected with a first corresponding contact in the second connector, couples a data bus between the host device and the accessory and enables commands and data to be exchanged between the accessory and the host device over the first contact as part of a normal data communication process, and a second contact that, when physically connected with a second corresponding contact in the second connector, couples a power line between the host device and the accessory, wherein the accessory provides power to the host device via the second contact;
    detection circuitry configured to:

detect detachment of the first connector from the second connector by detecting when the first contact in the first connector is no longer in physical contact with the first corresponding contact in the second connector; and generate a signal in response to the detection; and protection circuitry configured to:

receive the signal from the detection circuitry; and in response to the signal, reduce current on the power line from a first current to a second current.

12. The accessory of claim 11 wherein the data bus is configured to either be in a first state or in a second state, and wherein in order to detect detachment, the detection circuitry is further configured to:

monitor the data bus to determine that the data bus changed from the first state to the second state;

after the data bus changes to the second state, determine a time period for which the data bus is in the second state; and if the time period exceeds a threshold time, determine that the first connector is detached from the second connector.

13. The accessory of claim 12 wherein the first state is logic "1" and the second state is logic "0."

14. The accessory of claim 12 wherein the threshold time is between 2 μs and 20 μs more than a time of a longest data pulse used during normal data communication between the accessory and the host device.

15. The accessory of claim 11 wherein the protection circuitry comprises:

a first current path having a first resistance; and a second current path connected in parallel to the first current path and having a second resistance higher than the first resistance; wherein the first current path and the second current path have a common input and output, the output being coupled to the second contact; and wherein to reduce the current on the power line, the protection circuitry enables the second current path and disables the first current path.

16. An accessory comprising:

a first connector comprising a plurality of contacts and configured to mate with a second connector of a host device, wherein the first connector includes a first contact that, when the first contact is physically connected to a first corresponding contact in the second connector, couples a data line between the accessory and the host device and enables commands and data to be exchanged between the accessory and the host device as part of a normal data communication process and a second contact that, when the second contact is physically connected to a second corresponding contact in the second connector, couples a power line between the accessory and the host device, and wherein the accessory is configured to provide a first operational current to the host device via the power contact; and circuitry configured to:

monitor the data line to determine whether the data line is in a logic "high" state or a logic "low" state;

if the data line is in the logic "low" state, determine a time duration for which the data line is in the logic "low" state, the time duration being calculated starting from a time when the data bus changed to the logic "low" state from an immediately preceding logic "high" state;

if the time duration exceeds a predetermined threshold value that is longer than a time period that the data line is pulled low during normal data communication over the data line, reduce current on the power contact to a second current.

17. The accessory of claim 16 wherein the circuitry comprises a first current path having a first resistance connected in parallel to a second current path having a second resistance higher than the first resistance and wherein the accessory is further configured to enable the first current path when the data bus is in the logic "high" state.

18. The accessory of claim 16 wherein the accessory is a cable.

19. The accessory of claim 16 wherein the second current is about 15 mA.

20. The accessory of claim 16 wherein the first connector comprises a first set of 8 contacts disposed on a top surface of a connector tab portion of the first connector and a second set of 8 contacts disposed on an opposing bottom surface of the connecter tab portion, wherein each contact in the first set of 8 contacts is connected to at least one contact in the second set of 8 contacts.

* * * * *

UNITED STATES PATENT AND TRADEMARK OFFICE
CERTIFICATE OF CORRECTION

PATENT NO. : 8,724,281 B2
APPLICATION NO. : 13/721564
DATED : May 13, 2014
INVENTOR(S) : Scott Mullins et al.

Page 1 of 1

It is certified that error appears in the above-identified patent and that said Letters Patent is hereby corrected as shown below:

In the claims:

Column 20, Line 33, Claim 7: delete "signal".

Signed and Sealed this
Eighth Day of July, 2014

Michelle K. Lee
*Deputy Director of the United States Patent and Trademark Office*